United States Patent
Abboud et al.

(10) Patent No.: US 11,333,576 B2
(45) Date of Patent: May 17, 2022

(54) METHOD AND DEVICE FOR MONITORING A BEARING EQUIPPING A ROTARY DEVICE

(71) Applicant: SAFRAN, Paris (FR)

(72) Inventors: Dany Abboud, Moissy-Cramayel (FR); Mohammed El Badaoui, Moissy-Cramayel (FR)

(73) Assignee: SAFRAN, Paris (FR)

( * ) Notice: Subject to any disclaimer, the term of this patent is extended or adjusted under 35 U.S.C. 154(b) by 32 days.

(21) Appl. No.: 16/958,419

(22) PCT Filed: Dec. 19, 2018

(86) PCT No.: PCT/FR2018/053421
§ 371 (c)(1),
(2) Date: Jun. 26, 2020

(87) PCT Pub. No.: WO2019/129956
PCT Pub. Date: Jul. 4, 2019

(65) Prior Publication Data
US 2021/0063276 A1  Mar. 4, 2021

(30) Foreign Application Priority Data
Dec. 28, 2017 (FR) ...................................... 1763312

(51) Int. Cl.
G01M 13/045 (2019.01)
G01M 15/14 (2006.01)
G01H 1/00 (2006.01)

(52) U.S. Cl.
CPC .......... G01M 13/045 (2013.01); G01H 1/003 (2013.01); G01M 15/14 (2013.01)

(58) Field of Classification Search
CPC ............ G01H 1/003; G01H 1/04; G01H 1/10; G01M 15/14; G01M 15/12; G01M 5/0033;
(Continued)

(56) References Cited

U.S. PATENT DOCUMENTS 6,389,887 B1 * 5/2002 Dusserre-Telmon ...................... G01H 1/003
73/114.77
8,380,447 B2 * 2/2013 Bechhoefer .............. G01H 1/00
702/34
(Continued)

FOREIGN PATENT DOCUMENTS

EP     1528377 A2 *  5/2005  ............. G01H 1/003

OTHER PUBLICATIONS

Teng et al, "Application of cyclic coherence function to bearing fault detection in a wind turbine generator under electromagnetic vibration", Nov. 2016, Mechanical Systems and Signal Processing 87 (2017) 279-293 (Year: 2016).*
(Continued)

*Primary Examiner* — Stephanie E Bloss
(74) *Attorney, Agent, or Firm* — Oblon, McClelland, Maier & Neustadt, L.L.P.

(57) ABSTRACT

A method includes obtaining a vibration signal acquired by an accelerometer sensor; eliminating a deterministic component of the vibration signal; obtaining, for a determined defect, a characteristic theoretical frequency of this defect and a determined maximum deviation around this theoretical frequency; computing, as a function of a cyclic frequency, an integrated cyclic coherence of the processed vibration signal; estimating an actual frequency of the defect on the basis of the integrated cyclic coherence, of the theoretical frequency of the defect and of the maximum deviation; computing a diagnostic indicator of the defect by summing M integrated cyclic coherences of the vibration signal evaluated as M cyclic frequencies respectively equal to M harmonics of the estimated actual frequency of the defect; comparing the diagnostic indicator of the defect with a predetermined threshold, and in the event of it being exceeded, detecting the defect on the bearing.

14 Claims, 2 Drawing Sheets

(58) Field of Classification Search
CPC ............. G01M 5/0041; G01M 5/0066; G01M 13/045; G01M 13/04
See application file for complete search history.

(56) References Cited

U.S. PATENT DOCUMENTS

2007/0006636 A1* 1/2007 King .................... G01H 1/003
73/1.84
2013/0096848 A1* 4/2013 Hatch ................ G01M 13/045
702/39
2014/0039809 A1* 2/2014 Girondin ............ G01N 29/4463
702/39

OTHER PUBLICATIONS

International Search Report dated Apr. 26, 2019 in PCT/FR2018/053421 filed on Dec. 19, 2018, 2 pages.
French Preliminary Search Report dated Sep. 13, 2018 in French Application 1763312 filed on Dec. 28, 2017, 1 page.
Borghesani, P. et al., "Application of cepstrum pre-whitening for the diagnosis of bearing faults under variable speed conditions," Mechanical Systemsand Signal Processing, vol. 36, 2013, pp. 370-384, XP055461483.
Antoni, J., "Cyclic spectral analysis of rolling-element bearing signals: Facts and fictions," Journal of Sound and Vibration, vol. 304, 2007, pp. 497-529, XP022083965.
Tafinine, F., "On-line vibration monitoring of bearing faults in induction machine using Cyclic Spectral Analysis," MATEC Web of Conferences, vol. 83, 09010, 2016, pp. 1-4, XP055506354.

* cited by examiner

METHOD AND DEVICE FOR MONITORING A BEARING EQUIPPING A ROTARY DEVICE

BACKGROUND OF THE INVENTION

The invention relates to the general field of rotary machines or devices, and more particularly relates to the bearings equipping such machines or devices, such as for example ball or roller bearings.

It has a preferred but non-limiting application in the field of aeronautics in which many rotary machines are used.

Bearings, and in particular ball or roller bearings, are rotary mechanical devices widely used in rotary machines and the role of which is to drive transmission shafts in rotation. Such a bearing is generally composed of two coaxial bushes (an inner bush and an outer bush) between which are placed rolling elements (balls or rollers), retained in a cage. The rotary movement of the shaft is provided by the movement of the rolling elements.

Due to their elementary role in mechanical transmission systems, bearings are constantly stressed and therefore embrittled. They can undergo degradation of the surface condition or the shape of the inner or outer bushes, as well as the rolling elements. Damage to a bearing can lead to an untimely stopping of the machine in which it is used.

In order to avoid such a situation, it is known to monitor the condition of the bearings equipping a rotary machine to be able to detect the presence of defects in these bearings early on. One of the most commonly used techniques for conducting this monitoring is based on the vibrational analysis of signals acquired by means of sensors such as accelerometers placed near the bearings.

The principle on which the vibrational analysis is based is as follows: when a rolling element (ball or roller) of the bearing comes into contact with a defective surface of the bearing (due for example to flaking or cracking on the surface of one of the bushes of the bearing), periodic impacts occur which produce a vibration at a specific frequency, characteristic of the defect affecting the bearing, and which then change the statistical structure of the vibration signal acquired by the accelerometer. A theoretical value of the specific frequency of the defect can be easily obtained from the geometrical features of the bearing and its kinetics. The detection of the defect affecting the bearing is then done by identifying in the vibration signal acquired by the accelerometer a component at the specific spectral frequency of this defect, for example by carrying out a spectral analysis or an analysis of the envelope of the vibration signal.

However, current monitoring systems implementing vibrational analysis encounter several practical difficulties.

Specifically, today there is a need to monitor increasingly complex equipment, particularly in the field of aeronautics, which can comprise several rotary elements in addition to the bearings (e.g. compressors, gears, fans etc.). This monitoring, for obvious reasons of bulk, must furthermore be performed with a small number of accelerometers. The result of this is that the component representing the defect can be masked by noise coming from other sources of extraneous vibration (i.e. other rotary elements of the equipment item under consideration), so that the methods used in current monitoring systems (for example envelope analysis) are not always capable of detecting this defect. This can lead to the late detection of the defect, or even an inability to detect the defect.

To palliate this drawback, it is possible to have recourse to source separation techniques. However, these techniques have a high computing cost, and are often impossible to implement in real time.

Furthermore, a particular difficulty that arises when bearings are monitored by vibrational analysis is that the actual frequencies of the defects affecting these bearings can differ from the theoretical values computed for the requirements of vibrational analysis on the basis of the geometrical features of the bearing and its kinetics. This is due to the slippage of the bearings on the one hand, and on the other hand, the fact that damage to the bearing is generally accompanied by a phenomenon of friction which tends to slow down the rotation of the damaged bearing and modify its kinetics.

The document EP 2 693 176 describes a method for detecting defects of a bearing by vibrational analysis which attempts to solve the aforementioned problems. This method relies on pre-processing by means of a autoregressive filter of a vibration signal acquired by means of an accelerometer placed on the casing of the system comprising the bearings to be monitored, followed by an analysis of the envelope of the vibration signal resulting from the preprocessing. However this method of detection has a relatively high complexity in terms of implementation, particularly due to the preprocessing carried out. Furthermore, the effectiveness of the preprocessing carried out depends for the most part on the determination of several parameters (e.g. order of the autoregressive filter, etc.) which can turn out to be complicated in practice.

SUBJECT AND SUMMARY OF THE INVENTION

The present invention notably has the aim of remedying the aforementioned inadequacies of the prior art by proposing a method for monitoring a bearing equipping a rotary device, comprising:

- a step of obtaining a vibration signal acquired by an accelerometer sensor, said vibration signal containing a vibrational signature of the bearing;
- a step of processing the vibration signal comprising the elimination of a deterministic component of the vibration signal;
- a step of obtaining, for a determined defect liable to affect the bearing, a characteristic theoretical frequency of this defect and a determined maximum deviation around this theoretical frequency;
- a step of computing, as a function of a cyclic frequency, a so-called integrated cyclic coherence of the processed vibration signal averaged over a predetermined band of spectral frequencies;
- a step of estimating an actual frequency of the defect on the basis of the integrated cyclic coherence, of the characteristic theoretical frequency of the defect and of the determined maximum deviation around this theoretical frequency;
- a step of computing a diagnostic indicator of the defect by summing an integer number M of integrated cyclic coherences of the vibration signal evaluated as M cyclic frequencies respectively equal to M harmonics of the estimated actual frequency of the defect;
- a step of comparing the diagnostic indicator of the defect with a predetermined threshold for this defect; and
- in the event of the threshold being exceeded by the diagnostic indicator, a step of detecting the defect on the bearing.

Correspondingly, the invention also concerns a device for monitoring a bearing equipping a rotary device, this monitoring device comprising:
- a first obtaining module, configured to obtain a vibration signal acquired by an accelerometer sensor, said vibration signal containing a vibrational signature of the bearing;
- a module for processing the vibration signal, configured to eliminate a deterministic component of the vibration signal;
- a second obtaining module, configured to obtain for a determined defect liable to affect the bearing, a characteristic theoretical frequency of this defect and a determined maximum deviation around this theoretical frequency;
- a first computing module, configured to compute, as a function of a cyclic frequency, a so-called integrated cyclic coherence of the processed vibration signal averaged over a predetermined band of spectral frequencies;
- an estimating module, configured to estimate an actual frequency of the defect on the basis of the integrated cyclic coherence, of the characteristic theoretical frequency of the defect and of the determined maximum deviation around this theoretical frequency;
- a second module for computing a diagnostic indicator of the defect, configured to compute said indicator by summing an integer number M of integrated cyclic coherences of the vibration signal evaluated as M cyclic frequencies respectively equal to M harmonics of the estimated actual frequency of the defect;
- a comparing module, configured to compare the diagnostic indicator of the defect with a predetermined threshold for this defect and to detect the defect on the bearing in the event of the threshold being exceeded by the diagnostic indicator.

The invention can apply to various types of bearing, and in particular to a ball bearing or to a roller bearing.

The invention therefore proposes a technique for monitoring a bearing equipping a rotary device based on a cyclostationary analysis of the vibration signal acquired by an accelerometer sensor. The accelerometer sensor is placed in such a way that the vibration signal that it acquires contains a vibrational signature of the bearing. It should be noted that for this purpose, the accelerometer sensor can be placed near the bearing or on the casing of the system that comprises the bearing that one seeks to monitor, but it can also be placed at a given point of the bearing as long as a sufficient signal-to-noise ratio is ensured (typically in the order of 5%).

The cyclostationary analysis proposed by the invention makes it possible to extract from the vibration signal a diagnostic indicator of a defect liable to affect the bearing (e.g. a defect affecting an inner bush of the bearing, a defect affecting an outer bush of the bearing etc.) which, when it is compared with a determined threshold for this defect, makes it possible to detect whether the bearing is affected or not by said defect. This diagnostic indicator is advantageously computed after applying (pre)processing to the vibration signal consisting in ridding it of its deterministic component; this deterministic component is typically generated by other rotary elements than the monitored bearing (which itself contributes to the random component of the vibration signal), and liable to interfere with the vibration signal acquired by the sensor.

It will be noted that the indicator derived in accordance with the invention is determined for a given defect liable to affect the bearing since it depends on an actual frequency of the defect estimated on the basis of the characteristic theoretical frequency of the defect and of a determined maximum deviation around this theoretical frequency, each defect manifesting as a different theoretical frequency and as a maximum possible deviation of the actual frequency of the defect with respect to this theoretical frequency. Thus, by deriving several indicators relating to a plurality of defects liable to affect the bearing (e.g. an indicator associated with a defect on the inner bush of the bearing, an indicator associated with a defect on the outer bush of the bearing, an indicator associated with a defect on the cage of the bearing, an indicator associated with a defect on a rolling element of the bearing etc.), it is possible to easily identify the element or elements of the bearing that have a defect. This makes it possible to effect targeted maintenance on the bearing.

Advantageously, the cyclic coherence of the processed vibration signal makes it possible to highlight a signature of the defect including when it is "drowned" in considerable background noise (related for example to a plurality of defective rotary elements located near the monitored bearing). Specifically, the inventors have had the judicious idea of making use of the cyclostationary characteristic of the vibration signals generated by the defects liable to affect the bearings equipping the rotary machines. This cyclostationarity manifests as the presence in the vibration signals of a pattern of periodic appearance, made use of by the invention.

This results in a robustness of the defect diagnostic indicators proposed by the invention. These indicators are furthermore computed taking into account an estimate of the "actual" frequency of the defect, which can be different from the characteristic theoretical frequency of the defect which can be easily obtained on the basis of the geometrical features of the bearing and its kinetics. This avoids having indicators biased by an inaccurate knowledge of the defect frequency. On the contrary, the diagnostic indicators proposed by the invention supply a reliable and accurate estimate of the severity of the defects affecting, where applicable, the monitored bearings.

The indicators proposed by the invention are also easy to compute such that the monitoring effected using the invention can be carried out in real time.

The invention therefore allows the reliable and early detection of a defect affecting, where applicable, a bearing, and the location of this defect, for a low complexity of implementation.

Furthermore, owing to the invention, several bearings can be monitored in parallel by means of a single sensor (for example a single accelerometer sensor). The invention therefore makes it possible to minimize the number of sensors required on board a system including several bearings for the monitoring of these bearings, which translates into a substantial saving in terms of bulk by comparison with certain monitoring techniques of the prior art.

The invention therefore has a preferred but non-limiting application in the field of aeronautics. The rotary device of which a bearing is monitored can thus be installed in an aircraft engine, the monitored bearing being for example a ball or roller bearing conventionally equipping such an engine.

Thus, the invention also concerns an aircraft engine comprising at least one bearing equipping a rotary device of the aircraft engine, at least one accelerometer sensor able to acquire a vibration signal containing a vibrational signature of the bearing, and a device for monitoring the bearing according to the invention.

It should however be noted that the invention can applied to many other fields, such as for example wind turbines, car engines, gears etc.

In a particular embodiment of the invention, the vibration signal has been acquired by the accelerometer sensor in a stationary rating of the rotary device (in other words when its operating parameters, such as for example its average rotation speed, its pressure, its temperature, its load etc., are constant or quasi-constant.)

However, this assumption is not limiting and the invention can also be applied when the vibration signal has been acquired during a variable rating of the rotary device, preferably when the variations of the rating remain in the order of 15-20%. In this case, the invention considers a number of cyclic frequencies "normalized" with respect to the average frequency of mechanical rotation of the bearing; such normalized frequencies are also more commonly referred to as "orders" and make it possible to be independent of the variability of the rating of rotation of the rotary device.

In a particular embodiment, the step of processing comprises a step of spectral whitening of the vibration signal.

Such a whitening of the spectrum of the vibration signal is particularly simple and fast to implement. It consists in dividing the Fourier transform of the vibration signal by its modulo while keeping its phase, and can therefore be done blind, i.e. without knowing the characteristic frequencies of the deterministic component of the signal. Although the random component of the vibration signal, which contains the signature of the defect, where applicable, affecting the bearing, can be weakened by this whitening, this weakening has only a small impact on defect detection due to the diagnostic indicator proposed by the invention, which is computed on the basis of the integrated cyclic coherence of the processed vibration signal. This is because the computing of the integrated cyclic coherence of a signal implicitly comprises a whitening operation so that the whitening operation carried out during the processing step has little or no effect on the computed diagnostic indicator.

In a particular embodiment, the step of computing the integrated cyclic coherence comprises:
  estimating, for a given cyclic frequency, the cyclic correlation of the processed vibration signal as a function of a spectral frequency;
  computing, on the basis of the estimated cyclic correlation, the cyclic coherence of the processed vibration signal for said given cyclic frequency as a function of the spectral frequency; and
  averaging, over said predetermined band of spectral frequencies, the square of the amplitude of the cyclic coherence of the processed vibration signal computed for said given cyclic frequency, the result of said average supplying the integrated cyclic coherence for said given cyclic frequency.

This way of computing the integrated cyclic coherence makes it possible to keep the information contained in the vibration signal acquired by the sensor which concern the defect, where applicable, affecting the bearing (and which are described by the cyclic frequency), while maximizing the signal-to-noise ratio owing to the average taken over a predetermined band of spectral frequencies.

This band of frequencies is for example taken as equal to $[k1 \cdot \Delta f; k2 \cdot \Delta f]$, where $\Delta f$ denotes the considered spectral resolution for estimating the cyclic coherence, and k1 and k2 two real or integer numbers. Such a range of frequencies makes it possible, by adequately adjusting the numbers k1 and k2, on the one hand to minimize the contribution of stationary noise at low frequencies (i.e. below $k1 \cdot \Delta f$) while eliminating cyclic aliasing at high frequencies (i.e. above $k2 \cdot \Delta f$).

It should be noted that in a variant, it is possible when taking the computed average, to raise the amplitude of the cyclic coherence to a different order from the second order, such as for example the first order or the fourth order. However, the inventors have found that the higher the order under consideration, the less early the detection of the defect.

In a particular embodiment, the cyclic correlation of the processed vibration signal is estimated by means of a Welch estimator.

This estimator has the advantage of possessing remarkable statistical properties and more specifically of supplying an estimate having a low quadratic error.

Furthermore, it is particularly simple and easy to implement, and requires a relatively low computing cost.

Such an estimator is moreover very effective in a context where high rotation speeds are considered (e.g. when the rotary device is installed on board an aircraft such as an airplane or a helicopter).

Of course, other estimators can be used for estimating the cyclic correlation of the processed vibration signal, such as for example an estimator by cyclic periodogram, an estimator by smoothed cyclic periodogram, an estimator by cyclic modulation spectrum, etc.

In a particular embodiment, the step of estimating the actual frequency of the defect comprises the computing of the integrated cyclic coherence for a plurality of cyclic frequencies contained in an interval defined between the characteristic theoretical frequency of the defect minus the maximum deviation defined for this theoretical frequency and the characteristic theoretical frequency of the defect plus the maximum deviation defined for this theoretical frequency, the actual frequency of the defect corresponding to the cyclic frequency among said plurality of cyclic frequencies for which the integrated cyclic coherence is at a maximum.

This embodiment makes it possible, by computing the integrated cyclic coherence for a plurality of cyclic frequencies contained in an interval defined as proposed, to compensate for the absence of knowledge of the exact frequency of the defect affecting, where applicable, the bearing. This difficulty is solved in this embodiment by considering that the actual frequency of the defect is that which maximizes the integrated cyclic coherence over the interval under consideration defined around the theoretical frequency of the defect. It should be noted that in the case of a sound bearing (i.e. not having any defect), the value obtained for the actual frequency of the defect is not related strictly speaking to a defect; this is not obstructive as, in this case, the indicator computed as proposed in the invention will have a value that will not exceed the threshold under consideration during the comparing step (specifically, the probability of another rotary element coinciding with the defined interval is zero or virtually zero).

In a particular embodiment, two consecutive cyclic frequencies of said plurality of cyclic frequencies, respectively denoted $\alpha$ and $\alpha + \Delta\alpha$, are chosen such that the ratio $\alpha/d\alpha$ is an integer number.

The application of this criterion for choosing the cyclic frequencies at which the integrated cyclic coherence is computed makes it possible to optimize the computing cost.

In a particular embodiment, the integer number M is contained between 6 and 10.

The number of harmonics present in the vibration signal depends on the impulsiveness of the vibration signal generated by this defect. In a known manner, the impulsiveness of a signal manifests as high amplitude peaks in this signal. However, this impulsiveness itself depends, in a known manner, on the severity of the defect affecting the bearing. Consequently, considering a large value of M when determining the diagnostic indicator offers the possibility of taking into account more information about the condition of the bearing and the severity of the defect affecting this bearing. However, a large value of M can increase the estimating error marring the computed indicator and reduce its effectiveness in terms of earliness of defect detection.

Contrariwise, considering a low value of M makes it possible to improve the earliness of defect detection.

The inventors have found that in practice a number M contained between 6 and 10 offers a good trade-off making it possible to provide both early detection of a defect affecting the bearing while ensuring that the diagnostic indicator reflects the severity of this defect in a sufficiently relevant manner.

In a particular embodiment, the monitoring method further comprises a step of giving notification of the defect comprising at least one item of information from among:
an identification of the defective bearing;
an indication of a defective element on said bearing; and/or
an indication of a severity of the defect detected on the bearing.

This makes it possible to have appropriate maintenance of the monitored bearing.

In a particular embodiment, the different steps of the monitoring method are determined by computer program instructions.

Consequently, the invention also concerns a computer program on an information medium, this program being able to be implemented in a monitoring device or more generally in a computer, this program including instructions suitable for implementing the steps of a monitoring method as described above.

This program can use any programming language, and be in the form of source code, object code, or any intermediate code between source code and object code, such as in a partially compiled form, or in any other desirable form.

The invention also concerns an information medium readable by a computer, and including instructions of a computer program as mentioned above.

The information medium can be any entity or device capable of storing the program. For example, the medium can include a storage means, such as a ROM, for example a CD-ROM or a microelectronic circuit ROM, or else a magnetic storage medium, for example a diskette (floppy disk) or a hard disk.

Additionally, the information medium can be a transmissible medium such as an electrical or optical signal, which can be conveyed via an electrical or optical cable, by radio or by other means. The program according to the invention can in particular be downloaded over a network of Internet type.

Alternatively, the information medium can be an integrated circuit into which the program is incorporated, the circuit being suitable for executing or for being used in the execution of the method in question.

BRIEF DESCRIPTION OF THE DRAWINGS

Other features and advantages of the present invention will become apparent from the description given below, with reference to the appended drawings which illustrate an exemplary embodiment thereof, devoid of any limiting nature. In the figures.

DETAILED DESCRIPTION OF AN EMBODIMENT

Figure 1:
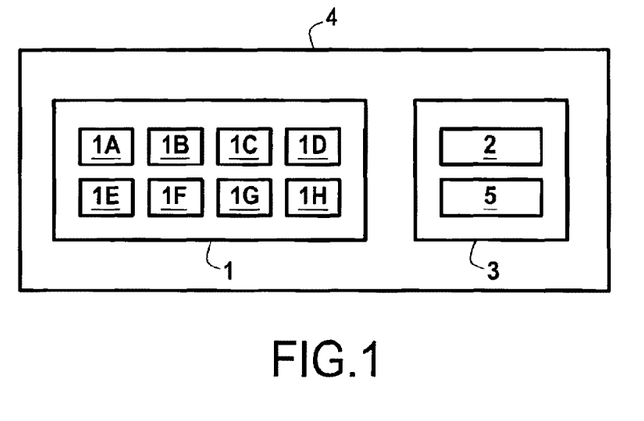
FIG. 1 schematically represents a device for monitoring a bearing in accordance with the invention in a particular embodiment.

FIG. 1 shows, in its environment, a device 1 for monitoring a bearing 2 equipping a rotary mechanical device 3 in accordance with the invention in a particular embodiment.

In the example envisioned in FIG. 1, the bearing 2 is a ball bearing and the rotary device 3 equipped with this ball bearing is for example a compressor of a turbojet engine 4 in accordance with the invention. The bearing 2 is here assumed to permit the driving in rotation of a shaft of the compressor 3 of the turbojet engine 4 about a predefined axis of rotation.

This example is however given only by way of illustration, and the invention can also be applied to other contexts. Thus for example, the bearing 2 can be a roller bearing, the rotary device 3 can be any rotary mechanical device, an element of which is driven in rotation by means of the bearing 2, and other aircraft engines than a turbojet engine can be envisioned. The invention can also be applied to another context than the aeronautical context.

In accordance with the invention, the monitoring device 1 is able to effect the monitoring of the bearing 2, on the basis of a vibration signal acquired by a sensor 5 equipping the turbojet engine 4 over at least one predefined time period of duration T. The sensor 5 is an accelerometer placed here on the casing of the compressor 3 so as to sense the vibrations emitted by the bearing 2 and more specifically by its elements (the vibrational signature of the bearing within the meaning of the invention).

In a manner known per se, a ball bearing is composed of various elements, and more specifically two coaxial bushes (a so-called inner or internal bush and a so-called outer or external bush) between which are placed balls held spaced apart by a cage. In this way, the balls can roll between the inner bush and the outer bush. The invention is intended to allow the detection of a defect affecting at least one of these elements.

The placement of the accelerometer 5 to allow it to acquire a vibration signal containing the vibrational signature of the bearing 2 does not pose any difficulty to those skilled in the art, and depends on the rotary mechanical device under consideration and on the context in which the latter is used. It is not described in detail here. In the case of a shaft of a compressor of a turbojet engine as envisioned in FIG. 1, the accelerometer 5 is for example placed on the casing of the compressor 3.

In a variant, the accelerometer 5 can be placed in a place further from the bearing 2 strictly speaking as long as it makes it possible to acquire a signal containing a vibrational signature of the bearing 2 with a signal-to-noise ratio preferably greater than 5%.

The time-based vibration signal denoted X(t) acquired by the accelerometer 5 over the period T when the rotary mechanical device 3 is in rotation, is processed by an acquisition system integrated here into the accelerometer 5 comprising a conditioner, a sample and hold and an analog-to-digital converter. Such an acquisition system is known per se, and is not described in detail here. It delivers a sampled digital signal at a predefined sampling frequency Fs derived from the vibration signal X(t) acquired by the accelerometer. The sampling frequency Fs is chosen to be high enough to preserve the kinetic and dynamic information about the bearing 2. In an aeronautical context such as that envisioned in FIG. 1, Fs is taken as equal, for example, to 50 kHz. It is assumed here that the period T over which the vibration signal X is acquired is a multiple L of the sampling period, i.e. T=L/Fs. L denotes in an equivalent manner the digital length of the vibration signal (i.e. the number of samples Xb(n) derived by the acquisition system on the basis of the vibration signal X(t) acquired by the accelerometer 5).

The sampled vibration signal (vibration signal within the meaning of the invention), the samples of which are referred to in the rest of the description as $X_b(n)$, where n denotes an integer greater than 1, is then transmitted to the monitoring device 1 for analysis with a view to detecting the presence of any defect on the bearing 2. In the embodiment described here, this analysis is intended to be carried out in real time, and the monitoring device 1 is installed on board the aircraft propelled by the turbojet engine 4 (for example in an electronic control unit of this turbojet engine 4).

In a variant, the monitoring device 1 can be located in a remove device, for example in the example envisioned here, in a device on the ground able to communicate via a telecommunications network with the accelerometer 5 or with an electronic control unit of the turbojet engine 4 able to retrieve the vibration signal X(t) acquired by the accelerometer 5.

Figure 2:
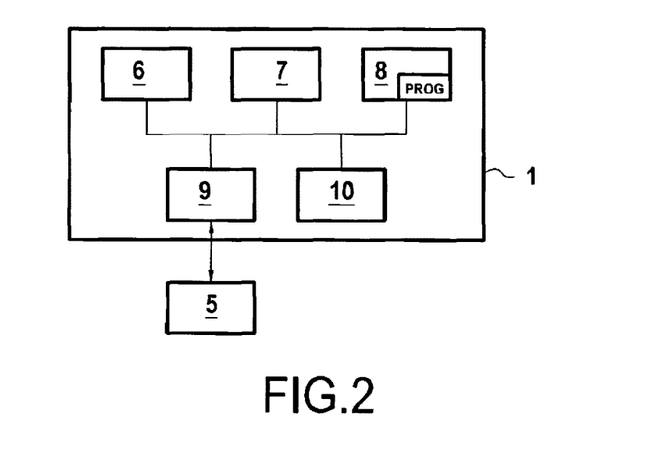
FIG. 2 represents the hardware architecture of the bearing monitoring device of FIG. 1.

In the embodiment described here, the monitoring device 1 has the hardware architecture of a computer, as illustrated in FIG. 2.

It comprises in particular a processor 6, a random access memory 7, a read-only memory 8, a non-volatile flash memory 9 along with communicating means 10 particularly allowing the monitoring device 1 to communicate with the accelerometer 5 to obtain the vibration signal s(t) generated by the bearing 2 and acquired by the accelerometer. These communicating means for example comprise a digital data bus or any other communication interface, in particular a communication interface on a telecommunications network, when the monitoring device 1 is not found on board the aircraft propelled by the turbojet engine 4.

The read-only memory 8 of the monitoring device 1 forms a storage medium in accordance with the invention, readable by the processor 6 and on which is stored a computer program PROG according to the invention.

The computer program PROG here defines functional and software modules, configured to implement a method for monitoring the bearing 2 in accordance with the invention. These functional modules are based on and/or control the hardware elements 6-10 of the monitoring device 1 mentioned previously. Here they include in particular, as illustrated in FIG. 1:

- a first obtaining module 1A, configured to obtain the vibration signal s(t) acquired by the accelerometer 5;
- a module 1B for processing the vibration signal s(t), configured to eliminate a deterministic component of the vibration signal;
- a second obtaining module 1C, configured to obtain for a determined defect denoted d liable to affect the bearing 2, a characteristic theoretical frequency of this defect written $\beta_d^{th}$ and a maximum deviation denoted $\delta\beta_d$ determined around this theoretical frequency. This maximum deviation characterizes the maximum possible deviation that is allocated between the characteristic theoretical frequency of the defect and the actual or exact frequency of this defect;
- a first computing module 1D, configured to compute, as a function of the cyclic frequency here denoted α, a so-called integrated cyclic coherence of the processed vibration signal, averaged over a predetermined band of spectral frequencies chosen here so as to maximize the signal-to-noise ratio;
- an estimating module 1E, configured to estimate the actual frequency of the defect denoted $\beta_d^{act}$ on the basis of the integrated cyclic coherence computed by the first computing module 1D, the characteristic theoretical frequency $\beta_d^{th}$ of the defect and the determined maximum deviation $\delta\beta_d$ around this theoretical frequency;
- a second module 1F for computing a diagnostic indicator of the defect, configured to compute this indicator by summing an integer number M of integrated cyclic coherences of the processed vibration signal evaluated as M cyclic frequencies respectively equal to M harmonics of the estimated actual frequency of the defect;
- a comparing module 1G, configured to compare the diagnostic indicator of the defect computed by the second computing module 1F with a predetermined threshold for this defect and to detect the defect on the bearing in the event of the threshold being exceeded by the diagnostic indicator.

In the embodiment described here, the monitoring device 1 further possesses a notifying module 1H, able to notify a user or a remote equipment item of the existence of a defect on the bearing 2 where applicable. This notifying module 1H can in particular rely on the communicating means 10 of the monitoring device 1 or on input/output means thereof, such as for example a screen or a microphone able to signal the detection of a defect on the bearing 2 to a user installed near the monitoring device 1.

The functions of these different modules will now be described in more detail with reference to the steps of the monitoring method according to the invention.

Figure 3:
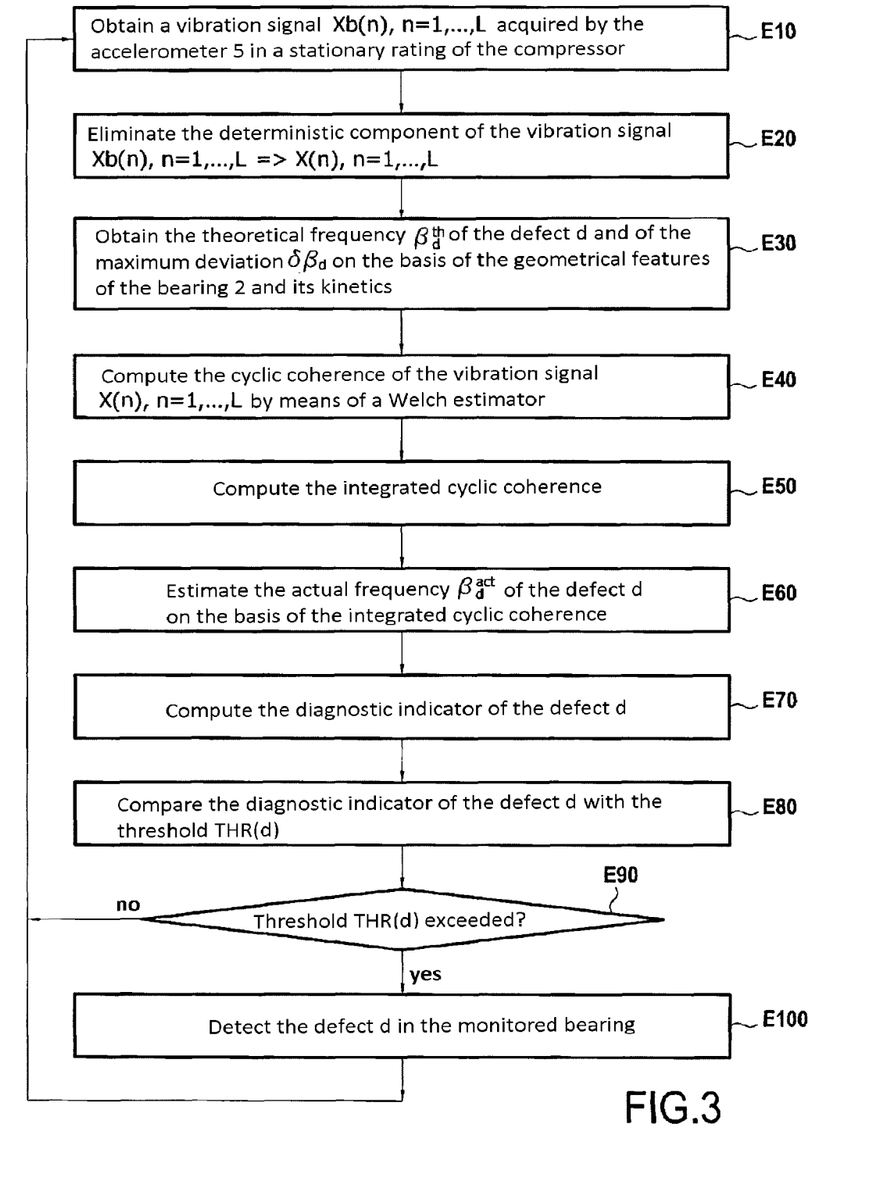
FIG. 3 illustrates, in the form of a block diagram, the main steps of the monitoring method according to the invention in a particular embodiment in which it is implemented by the monitoring device of FIG. 1.

FIG. 3 illustrates, in the form of a block diagram, the main steps of a monitoring method according to the invention in a particular embodiment in which it is implemented by the monitoring device 1 to monitor the bearing 2 equipping the compressor 3 of the turbojet engine 4.

It is assumed here that the accelerometer 5 is configured so as to acquire over a period of time of duration T=L/Fs, an acceleration vibration signal X(t) generated by the bearing 2 while the compressor 3 is in rotation driven by the bearing 2. The accelerometer 5 is configured here to acquire the vibration signal X(t) when the compressor 3 operates in a stationary or quasi-stationary rating: in the example envisioned here, this means that the rotation speed of the compressor and/or its load (i.e. its torque) are constant or quasi-constant (variation of less than 5% in the rotation speed of the compressor and its load). It should be noted that the duration T must not be chosen too short so as to ensure the accuracy of the diagnostic indicators derived by the invention. For a sampling frequency Fs=50 kHz, a duration T=2 s is a good trade-off.

The vibration signal X(t) acquired by the accelerometer 5 is sampled by the acquisition system of the accelerometer 5, at the sampling frequency Fs. The sampled vibration signal Xb(n), n=1, . . . , L, is transmitted by the acquisition system of the accelerometer 5 to the monitoring device 1, and more particularly to its first obtaining module 1A (step E10). The sampled vibration signal Xb(n) is more simply referred to in the rest of the description as the "vibration signal".

The vibration signal Xb(n), n=1, ..., L is supplied by the obtaining module 1A to the processing module 1B of the monitoring device 1. In a manner known per se, the vibration signal Xb(n), n=1, ..., L comprises a deterministic component and a random component; it is in this random component that manifest, where applicable, the vibrations related to the defect(s) affecting the bearing 2.

To better highlight the vibrations related to the defect(s), where applicable, affecting the bearing 2, the processing module 1B processes the vibration signal Xb(n), n=1, ..., L in order to eliminate its deterministic component (step E20).

In the embodiment described here, the elimination of the deterministic component of the vibration signal is carried out by the processing module 1B via a spectral whitening operation. To carry out this operation, the processing module 1B first computes the discrete Fourier transform of the vibration signal Xb(n). This discrete Fourier transform is denoted $DFT_{n \to m}\{Xb(n)\}$. It is defined in a known manner by:

$$DFT_{n \to k}^{W}\{X(n)\} = \sum_{n=0}^{W-1} X(n) e^{-j2\pi(n\Delta t)(k\Delta f)}$$

where:

$$\Delta f = \frac{1}{\Delta t \cdot W} = \frac{F_s}{W}$$

denotes the frequency resolution, W representing the size of the window over which the discrete Fourier transform is computed, and $$\Delta t = \frac{1}{F_s}$$

denotes the time-based resolution.

Then the processing module 1B divides the discrete Fourier transform obtained by the modulo of the discrete Fourier transform, and computes the inverse discrete Fourier transform of the result obtained. In other words, the processing module 1B computes the following signal X(n), for n=1, ..., L (processed vibration signal within the meaning of the invention):

$$X(n) = IDFT_{m \to n}^{L}\left\{\frac{DFT_{n \to m}\{Xb(n)\}}{|DFT_{n \to m}\{Xb(n)|\}}\right\}$$

where $IDFT_{m \to n}^{L}$ denotes the inverse discrete Fourier transform defined as follows $$IDFT_{n \to k}^{W}\{X(n)\} = \frac{1}{W}\sum_{n=0}^{W-1} X(n) e^{+j2\pi(n\Delta t)(k\Delta f)}$$

considering the same notations used during the definition of the discrete Fourier transform.

In this way, the phase of the vibration signal Xb(n) is preserved.

This whitening operation has the advantage of being simple to implement.

In a variant, other techniques can be applied by the processing module 1B to eliminate the deterministic component of the signal Xb(n). Such a technique is for example described in the document by N. Sawalhi et al. Titled "Signal pre-whitening using cepstrum editing (liftering) to enhance fault detection in rolling element bearings", Proceedings of the 24th International Congress on Condition Monitoring and Diagnostics Engineering Management (COMADEM), 2011. It consists in cancelling the entire complex cepstrum of the vibration signal by keeping only the component of the signal relating to the zero frequency.

The processed (and whitened) vibration signal X(n), n=1, ..., L is transmitted to the first computing module 1D of the monitoring device 1 so that it can analyze the cyclostationarity of the signal. Specifically, the presence of a defect on the bearing 2 manifests as a component in the cyclostationary signal which manifests as a periodic auto-covariance function. This property of cyclostationarity is due mainly, on the one hand, to the recurrence of the defect on a periodic basis (related to the rotation of the rotary device driven by the bearing), and on the other hand, to the presence of a fluctuation between the time of arrival of the impacts caused by the slippage of the balls of the bearing 2.

Each defect d liable to affect a bearing is characterized by a specific frequency. No limitation is attached to the nature of the defect d, the latter being able to concern one or more elements of the bearing. Thus for example, the defect d can be a defect of the outer bush of the bearing 2, a defect of the inner bush of the bearing 2, a defect of the cage of the bearing 2 or of a ball of the bearing 2. Each of these defects is characterized by a characteristic frequency that is specific to it.

This characteristic frequency of the defect d under consideration can be easily estimated (obtained) theoretically by the second obtaining module 1C of the monitoring device 1 on the basis of the knowledge of the geometrical features of the bearing 2 and its kinetics (step E30). The characteristic theoretical frequency of the defect d is denoted $\beta_d^{th}$. The geometrical features of the bearing 2 can be easily obtained from the technical data sheet of the bearing 2. The kinetics of the bearing (i.e. its rotation speed) can be obtained via a sensor placed appropriately within the compressor 3, in a manner known per se. Thus, by way of illustration:

the characteristic theoretical frequency $f_{d=bext}$ of a defect d of the outer bush of the bearing is given by:

$$f_{d=bext} = \frac{f_r}{2} N_B \left(1 - \frac{D_B \cos \psi}{D_p}\right)$$

the characteristic theoretical frequency $f_{d=bint}$ of a defect d of the inner bush of the bearing is given by:

$$f_{d=bint} = \frac{f_r}{2} N_B \left(1 + \frac{D_B \cos \psi}{D_p}\right)$$

the characteristic theoretical frequency $f_{d=c}$ of a defect d of the cage of the bearing is given by:

$$f_{d=c} = \frac{f_r}{2}\left(1 - \frac{D_B \cos \psi}{D_p}\right)$$

the characteristic theoretical frequency $f_{d=bille}$ of a defect d of a ball of the bearing is given by:

$$f_{d=bille} = \frac{f_r}{2} N_B \left(1 - \left(\frac{D_B \cos \psi}{D_P}\right)^2\right)$$

where:
$f_r$ denotes the mechanical rotation frequency of the bearing 2;
$N_B$ denotes the number of balls of the bearing 2;
$D_B$ denotes the diameter of the balls of the bearing 2;
$D_P$ denotes the average diameter of the bearing 2; and
$\psi$ denotes the angle of contact of the bearing 2.

The second obtaining module 1C also obtains for each defect d under consideration a determined maximum deviation $\delta\beta_d$ around the characteristic theoretical frequency $\beta_d^{th}$ of the defect d. In the example envisioned here, it is assumed for the sake of simplification that this maximum deviation is the same in percentage whatever the defect d envisioned, i.e. $\delta\beta_d = A\beta_d^{th}$ with A denoting a real constant independent of the defect d. In practice, the inventors have found that it suffices to choose a maximum deviation equal to a few percent of the characteristic theoretical frequency of the defect; for example A=3%.

Then, in the embodiment described here, the first computing module 1D of the monitoring device 1 computes the cyclic coherence of the processed vibration signal X(n), n=1, . . . , L (step E40).

In a known manner, the cyclic coherence of a signal is a statistical measurement that makes it possible to measure for each so-called cyclic frequency the degree of correlation between the signal and this same signal frequency-shifted. A coherence close to one for a cyclic frequency α indicates a strong correlation between the components of the signal under consideration at the frequencies f and f–α.

To compute the cyclic coherence of the signal X(n) at the cyclic frequency α, n=1, . . . , L, the first computing module 1D here uses a Welch estimator of the cyclic correlation of the signal, which is written as follows, to the nearest factor:

$\hat{S}_{2X}^{\alpha}(k\Delta f) = \Sigma_s^{S-1} DFT_{n \to k}^{Nw}\{w_s(n) \times (n) e^{j\pi\alpha n \Delta t}\} * DFT_{n \to k}^{Nw}\{w_s(n) \times (n) e^{-j\pi\alpha n \Delta t}\}$ where:
* denotes the conjugation operator;
w(n) denotes a sliding window (e.g. Hanning window, half-sine window, etc.) and $w_s(n) = w_s(n-sR)$ is the shifted version of the sliding window with 1<R<Nw, Nw denoting an integer number (e.g. a power of 2) representing the size of the Welch window, Nw-R denoting the overlap between the windows;
S is the largest integer less than or equal to (L–Nw)/R+1;
$\Delta f$ denotes the frequency-based or spectral resolution, which is equal to 1/($\Delta t \cdot Nw$). The size of the Welch window Nw will preferably be chosen to have a spectral resolution in the order of a few hundred Hertz in the application situation envisioned here;
k is an integer number, denoting the spectral channel under consideration.

Here the resolution of the cyclic frequency is considered to be $\Delta\alpha = 1/T$ for computing the cyclic correlation.

It should be noted that in the Welch estimator defined above, the cyclic frequency α is a frequency expressed in Hertz.

Of course, other estimators can be used in a variant to estimate the cyclic correlation of the processed vibration signal, such as for example an estimator by cyclic periodogram, an estimator by smoothed cyclic periodogram, an estimator by cyclic modulation spectrum, etc.

Then the computing module 1D derives on the basis of the Welch estimator thus computed the cyclic coherence of the signal X(n), n=1, . . . , L as follows:

$$\overline{\gamma}_{2X}^{\alpha}(k\Delta f) = \frac{\overline{S}_{2X}^{\alpha}(k\Delta f)}{(\overline{S}_{2X}^{0}(k\Delta f - \alpha/2)\overline{S}_{2X}^{0}(k\Delta f + \alpha/2))^{1/2}}$$

It should be noted that the cyclic correlation and the cyclic coherence thus computed are functions of the spectral frequency $k\Delta f$ and are indexed by the cyclic frequency α (they are therefore also a function of this cyclic frequency), the latter being expressed in Hertz. The spectral frequency highlights the dynamic characteristics of the system under consideration, whereas the cyclic frequency pertains to the modulations (mainly related to the defect, where applicable, affecting the bearing 2). The inventors therefore wished to keep the cyclic information carried by the cyclic frequency, but averaged the information carried by the spectral frequency over a chosen frequency band so as to maximize the signal-to-noise ratio.

For this purpose, the first computing module 1D computes a so-called integrated cyclic coherence by evaluating the average of the square of the amplitude of the cyclic coherence with respect to the cyclic frequency over a band of frequencies chosen so as to maximize the signal-to-noise ratio (step E50). This band of frequencies is defined here by the interval [k1$\Delta f$;k2$\Delta f$], where k1 and k2 denote two integers. The integrated cyclic coherence computed by the first computing module 1D is thus given by the following expression:

$$\overline{I}_{2X}^{\alpha} = \frac{1}{k1 - k1 + 1} \sum_{k1}^{k2} |\overline{\gamma}_{2X}^{\alpha}(k\Delta f)|^2$$

In the example envisioned here, for a sampling frequency Fs=50 kHz, k1$\Delta f$~1 kHz and k2$\Delta f$~20 kHz are chosen. These values make it possible to minimize the contribution of the stationary noise at low frequencies (below k1$\Delta f$) and eliminate cyclic aliasing at high frequencies (above k2$\Delta f$).

Of course, these values are only given by way of illustration and other values can be considered. In general, it will preferably be ensured that k2$\Delta f$<Fs–$\alpha_{max}$ where $\alpha_{max}$ denotes the maximum cyclic value sought and therefore depends on the characteristic theoretical frequency of the defect and on its order of harmonics (here taking into account the principle that the useful information for diagnosing a defect of the bearing is generally not found at the ends).

It should moreover be noted that in the embodiment described here, the square of the amplitude of the cyclic coherence has been considered when taking the average computed to obtain the integrated cyclic coherence. In a variant, it can be envisioned to raise the cyclic coherence to another order than the second order, for example the first order or the fourth order.

The integrated cyclic coherence computed by the first computing module 1D is then used by the monitoring device 1 to derive a diagnostic indicator of the defect d.

More specifically, for this purpose, the monitoring device 1, via its estimating module 1E, first estimates the "actual" (or else exact) frequency of the defect d (step E60). As mentioned previously and by definition, this characteristic actual frequency of the defect is contained within the interval $[\beta_d^{th}-\delta\beta_d; \beta_d^{th}+\delta\beta_d]$. To estimate this actual frequency, the estimating module 1E computes the integrated cyclic coherence for a plurality of cyclic frequencies $\alpha$ contained in this interval. In the embodiment described here, one assumes a resolution, respectively denoted $\Delta\alpha$ between two consecutive cyclic frequencies considered by the estimating module 1E chosen such that the ratio $\alpha/\Delta\alpha$ is an integer number. This criterion makes it possible to optimize the computing cost of the integrated cyclic coherence at the different cyclic frequencies under consideration.

Then the estimating module 1E estimates the actual frequency of the defect, denoted $\beta_d^{act}$, as being the value of the cyclic frequency corresponding to the maximum value of the computed integrated cyclic coherences, or:

$$\beta_d^{act} = \mathrm{argmax}_{\beta_d^{th}-\delta\beta_d \leq \alpha \leq \beta_d^{th}+\delta\beta_d} \overline{I_{2X}^{\alpha}}$$

It is noted that in the case where the bearing 2 does not have the defect d, the value $\beta_d^{act}$ has no significance strictly speaking and does not have the frequency of a defect of the bearing. This does not constitute a problem in itself; this is because it is highly improbable that the bearing 2 is affected with a separate defect from the defect d having an actual frequency contained in the interval $[\beta_d^{th}-\delta\beta_d; \beta_d^{th}+\delta\beta_d]$.

Then the monitoring device 1, by way of its second computing module 1F, computes a diagnostic indicator of the defect d (step E70). This indicator, denoted $\mu_X^d$, is the sum of the integrated cyclic coherences evaluated as M cyclic frequencies respectively equal to the M harmonics of the estimated actual frequency $\beta_d^{act}$ of the defect, M denoting an integer number, or:

$$\mu_X^d(M) = \sum_{m=1}^{M} \overline{I_{2X}^{m\tilde{\beta}_d^{act}}}$$

This indicator advantageously measures the cyclostationarity in the signal X, and consequently the contribution of the defect d associated with the frequency $\beta_d^{act}$.

In the embodiment described here, M has a predetermined value chosen between 6 and 10.

It should be noted that M denotes the number of harmonics of the defect d under consideration. The number of harmonics present in the signal generated by the defect depends on the impulsiveness of the signal, which in turn is linked to the severity of the defect. Thus, taking a large value of M supplies more information about the condition of the defect. However, taking a smaller value of M makes it possible to improve the earliness of the detection of the defect. Specifically, the inventors have found that in the case of a distributed defect, few harmonics are present in the integrated cyclic coherence, so the sum of a large number of harmonics leads to an increase in the estimating error, and therefore reduces the effectiveness of the computed indicator in terms of detection earliness.

In a variant embodiment, the estimating module 1F can estimate different diagnostic indicators by considering different values of the integer M.

The diagnostic indicator $\mu_X^d(M)$ thus computed is supplied to the comparing module 1G of the monitoring device 1. This then compares the indicator $\mu_X^d(M)$ with a predetermined alert threshold for the defect d, denoted THR(d) (step E80). This threshold is chosen so as to allow the detection of the defect d. It can be previously determined empirically by observing sound bearings and bearings having the defect d, or by a statistical computation based on the assumption of stationarity in the sound case. The threshold value THR(d) must not be chosen too high so as to ensure early detection, or too low to avoid numerous false alerts.

If the comparing module 1G determines that the diagnostic indicator exceeds the threshold THR(d) (i.e. is greater than it) (yes answer to the test step E90), then it detects that the bearing 2 is affected with the defect d (step E100).

In the embodiment described here, notification is then given of this detection by the notifying module 1H via an alert message, comprising all or part of the following information:
identification of the defective bearing (namely here the bearing 2);
indication of the defective element on the bearing (depends on the defect d detected); and
indication of the severity of the defect detected on the bearing 2 (given by the value of the indicator $\mu_X^d(M)$).

Then the monitoring of the bearing 2 is resumed (repetition of the steps E10 to E100).

It is noted that what has just been described for the defect d can be done for different defects liable to affect the bearing 2. In this way, the monitoring device 1 is in a position to provide a differential diagnostic and to identify which defect affects the bearing 2, i.e. to locate the origin or origins of the degradations undergone by the bearing 2 (inner bush, outer bush, balls, cage).

In the embodiment described here, the vibration signal X(t) acquired by the accelerometer 5 has been acquired during a stationary rating of the compressor 3.

In another embodiment of the invention, it is possible to consider a vibration signal acquired when the rotation rating of the compressor 3 is encountering a certain amount of variability, typically up to 15-20%.

In such a context, one preferably considers a normalized cyclic frequency denoted $\tilde{\alpha}$ with respect to the average rotation frequency $f_r$ in Hertz of the bearing 2 over the acquisition period T under consideration, or:

$$\tilde{\alpha} = \frac{\alpha}{f_r}$$

Such a normalized frequency is also more commonly called "order".

In this embodiment, in step E40, the first computing module 1D then uses the Welch estimator of the cyclic correlation of the corrected-phase signal, which is written as follows, to the nearest factor:

$$\tilde{S}_{2X}^{\tilde{\alpha}}(k\Delta f) \approx \sum DFT_{n\to k}^{Nw}\{w_s(n)X(n)e^{j\pi\tilde{\alpha}\theta(n)/2}\}^* DFT_{n\Delta t \to k\Delta f}^{Nw}\{w_s(n)X(n)e^{-j\pi\tilde{\alpha}\theta(n)/2}\}$$

where $\theta(n)$ denotes the angular measurement of a reference shaft (rotation shaft of the compressor 3 here) which makes it possible to evaluate the rotation frequency $f_r$ of the bearing.

The first computing module 1D then derives from this Welch estimator the corrected-phase cyclic frequency of the signal X(n), n=1, . . . , L in the following way:

$$\tilde{\gamma}_{2X}^{\tilde{\alpha}}(k\Delta f) = \frac{\tilde{S}_{2X}^{\tilde{\alpha}}(k\Delta f)}{(\tilde{S}_{2X}^{0}(k\Delta f - \tilde{\alpha}\cdot f_r/2)\tilde{S}_{2X}^{0}(k\Delta f + \tilde{\alpha}\cdot f_r/2))^{1/2}}$$

The other steps of the method remain unchanged as long as one considers normalized frequencies instead of frequencies expressed in Hertz. Thus, the theoretical frequencies of the defects are the same as those previously introduced to the nearest factor $f_r$ (i.e. these theoretical frequencies are divided by $f_r$).

Moreover, in the embodiments described here, for the sake of simplification, the signal is considered to come from a single accelerometer. The invention can however be applied to several accelerometers. In the same way, it makes it possible to simultaneously monitor several bearings.

The invention thus proposes a robust technique for monitoring bearings integrated into a rotary device. The inventors were able to observe, in various experiments, that this technique allows early detection of the defects affecting the bearings, notably earlier than the technique of the prior art proposed in the document EP 2 693 176, and this in various context (accelerometer placed on the defect bearing or away from it, in the presence of electromagnetic interference or not).

It should be noted that the invention has been described with reference to a vibration signal acquired by means of an accelerometer. The monitoring method proposed by the invention can however also be applied to an acoustic signal, acquired for example by means of a microphone or any other acoustic sensor, and containing an acoustic signature of the bearing that one wishes to monitor.

The invention claimed is:

1. A method for monitoring a bearing equipping a rotary device, comprising:
    obtaining a vibration signal acquired by an accelerometer sensor, said vibration signal containing a vibrational signature of the bearing;
    processing the vibration signal comprising elimination of a deterministic component of the vibration signal;
    obtaining, for a determined defect liable to affect the bearing, a characteristic theoretical frequency of the defect and a determined maximum deviation around the theoretical frequency;
    computing, as a function of a cyclic frequency, an integrated cyclic coherence of the processed vibration signal averaged over a predetermined band of spectral frequencies;
    estimating an actual frequency of the defect on a basis of the integrated cyclic coherence, of the characteristic theoretical frequency of the defect and of the determined maximum deviation around this theoretical frequency;
    computing a diagnostic indicator of the defect by summing an integer number M of integrated cyclic coherences of the vibration signal evaluated as M cyclic frequencies respectively equal to M harmonics of the estimated actual frequency of the defect;
    comparing the diagnostic indicator of the defect with a predetermined threshold for the defect; and
    in an event of the threshold being exceeded by the diagnostic indicator, detecting the defect on the bearing.

2. The monitoring method as claimed in claim 1, wherein the processing comprises spectral whitening of the vibration signal.

3. The monitoring method as claimed in claim 1, wherein the computing the integrated cyclic coherence comprises:
    estimating, for a given cyclic frequency, the cyclic correlation of the processed vibration signal as a function of a spectral frequency;
    computing, on a basis of the estimated cyclic correlation, the cyclic coherence of the processed vibration signal for said given cyclic frequency as a function of the spectral frequency; and
    averaging, over said predetermined band of spectral frequencies, a square of an amplitude of the cyclic coherence of the processed vibration signal computed for said given cyclic frequency, a result of said average supplying the integrated cyclic coherence for said given cyclic frequency.

4. The monitoring method as claimed in claim 3, wherein the cyclic correlation of the processed vibration signal is estimated with a Welch estimator.

5. The monitoring method as claimed in claim 1, wherein the estimating the actual frequency of the defect comprises computing of the integrated cyclic coherence for a plurality of cyclic frequencies contained in an interval defined between the characteristic theoretical frequency of the defect minus the maximum deviation defined for the theoretical frequency and the characteristic theoretical frequency of the defect plus the maximum deviation defined for the theoretical frequency, the actual frequency of the defect corresponding to the cyclic frequency among said plurality of cyclic frequencies for which the integrated cyclic coherence is at a maximum.

6. The monitoring method as claimed in claim 5, wherein two consecutive cyclic frequencies of said plurality of cyclic frequencies, respectively denoted $\alpha$ and $\alpha+\Delta\alpha$, are chosen such that a ratio $\alpha/d\alpha$ is an integer number.

7. The monitoring method as claimed in claim 1, wherein the integer number M is contained between 6 and 10.

8. The monitoring method as claimed in claim 1, further comprising giving notification of said defect comprising at least one item of information from among at least one of:
    an identification of the defective bearing;
    an indication of a defective element on said bearing; and
    an indication of a severity of the defect detected on the bearing.

9. The monitoring method as claimed in claim 1, wherein the vibration signal has been acquired by the accelerometer sensor in a stationary rating of the rotary device.

10. The monitoring method as claimed in claim 1, wherein the cyclic frequency is normalized with respect to a rotation frequency of the bearing.

11. A non-transitory information medium readable by a computer on which is stored a computer program including instructions for executing the method as claimed in claim 1, when the program is executed by a processor.

12. A device for monitoring a bearing equipping a rotary device, said monitoring device comprising:
    at least one memory;
    an interface for communicating with an accelerometer sensor; and
    a processor configured to:
        obtain a vibration signal acquired by the accelerometer sensor, said vibration signal comprising a vibrational signature of the bearing;
        process the vibration signal including eliminating a deterministic component of the vibration signal;
        obtain for a determined defect liable to affect the bearing, a characteristic theoretical frequency of the defect and a determined maximum deviation around the theoretical frequency;
        compute, as a function of a cyclic frequency, an integrated cyclic coherence of the processed vibration signal averaged over a predetermined band of spectral frequencies;

estimate an actual frequency of the defect on a basis of the integrated cyclic coherence, of the characteristic theoretical frequency of the detect and of the determined maximum deviation around the theoretical frequency;

compute a diagnostic indicator of the defect by summing an integer number M of integrated cyclic coherences of the vibration signal evaluated as M cyclic frequencies respectively equal to M harmonics of the estimated actual frequency of the detect; and compare the diagnostic indicator of the defect with a predetermined threshold for this defect and detect the defect on the bearing in an event of the threshold being exceeded by the diagnostic indicator.

13. The monitoring device as claimed in claim 12, wherein the bearing is a ball bearing or a roller bearing and the rotary device is installed in an aircraft.

14. An aircraft engine comprising at least one bearing equipping a rotary device of the aircraft engine, at least one accelerometer sensor able to acquire a vibration signal comprising a vibrational signature of said bearing, and a device for monitoring the bearing as claimed in claim 12.

* * * * *